United States Patent Office 3,103,431
Patented Sept. 10, 1963

3,103,431
TOBACCO SUCKER CONTROL
John Henry Wilson, Jr., Richmond, Va., assignor to Virginia-Carolina Chemical Corporation, Richmond, Va., a corporation of Virginia
No Drawing. Filed Feb. 20, 1961, Ser. No. 90,214
18 Claims. (Cl. 71—2.3)

This invention relates to a method for the control of tobacco axillary shoots (suckers). Specifically, it relates to their control with phosphonium halides.

Tobacco plants are topped at predetermined stages of growth. The purpose of topping or breaking out the terminal bud of tobacco is to redirect, toward increased leaf development, energies of the plant that would go to formation of the seed head. Topping tends to induce increased growth of the remaining leaves, causes thickening, increases the body and nicotine content and may produce darker colors by preventing development of the seed head and reducing the number of leaves on the stalk.

The usual effects of topping are largely lost, however, if the suckers or shoots appearing in the leaf axils are allowed to develop. If they are not removed, or controlled in some other manner, too much of the plant energy will be sapped, with the result that low quality leaves will be produced over the whole plant.

There are three widely known methods for controlling tobacco suckers. The oldest, one still practiced in certain areas, is the manual separation of the sucker from the leaf axil. This method is slow, laborious, and highly ineffective. As a rule, if control is to be maintained a field will have to be gone over repeatedly at intervals of about a week to remove the suckers as they redevelop.

Another method depends upon the use of certain oils (such as spent motor oils) to control the growth of suckers. The commonly used oils, if used improperly, will cause severe crop losses. Their use can result in extensive burning and/or rotting of the tobacco plant, leading to complete destruction of the plant from these effects alone, or their use can lead to localized burning and/or rotting. Localized destruction of plant tissue from these effects is not in itself fatal to the leaf products, but plant resistance can be weakened, thereby favoring the entry of bacteria or other plant-destroying agents.

Chemical methods for sucker control have not been totally successful, nor have they been widely accepted. Farmers and researchers at experiment stations have reported that the most widely used chemical will not give consistent results under all conditions. For example, it will not give good results unless the suckers which have begun to develop are removed prior to or immediately following its application. This is because only those suckers which form after its application are controlled.

Strictly from an economic point of view, farmers and cigarette and cigar manufacturers object to the use of the presently known chemical method for sucker control. Farmers object because the chemical ingredient tends to halt the growth of young leaves. This has a definite effect on the value of the tobacco crop, but farmers have continued to use it simply because no other chemical has been available to relieve them of the weekly hand-removal of suckers. It is my understanding that cigarette manufacturers object to its use because it affects the flavor of the cigarette and because less cigarettes per pound of tobacco are obtained due to thicker leaves obtained from plants treated with the chemical.

The above discussion on the use of oils and chemicals applies particularly to flue-cured varieties. Other types, such as Burley, are even more drastically affected when these two sucker-control methods are employed. In addition to the above effects, known chemicals will cause the top leaves of Burley to have an undesirable yellow color, indicating a chlorosis effect on this type of tobacco. Oils have been known to destroy significant portions of Burley stands because of extensive burning (blackening) and/or rotting. For this reason they are never recommended for use on Burley and some other types of tobacco.

It is therefore an object of my invention to provide a new method for the control of tobacco suckers, said method involving the use of phosphonium halides.

It is a further object to provide a group of compounds which affect only the axillary growth of the mature tobacco plant, i.e., compounds which control the suckers but which otherwise have no regulatory effect on the remaining portions of the mature plant.

It is still another object to provide a group of compounds whose use will eliminate entirely the hand-removal of suckers which have begun to form prior to their application. These and other objects will become apparent from the following disclosure.

I have now found that phosphonium compounds defined by the formula

wherein $R_1$, $R_2$, $R_3$, and $R_4$ are members of the group consisting of lower alkyl, alkenyl, benzyl, substituted benzyl, and naphthylmethyl and X is a member of the group consisting of Br, Cl and I are effective as sucker control agents and that they accomplish the above-stated objects.

Some of the compounds which are useful in the practice of my invention and which fall under the above definition are: $(CH_3)_4PI$; $(C_2H_5)_4PBr$; $(C_2H_5)_4PI$; $(C_3H_7)_4PI$; $(C_4H_9)_4PCl$; $(C_4H_9)_4PI$; $(C_4H_9)_4PBr$; $(C_4H_9)_3P(Br)C_3H_7$;

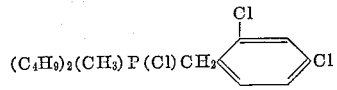

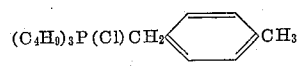

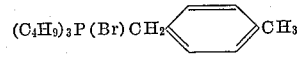

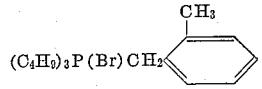

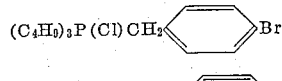

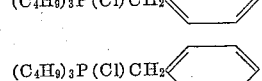

and

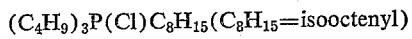

$(C_4H_9)_3P(Cl)C_8H_{15}$ ($C_8H_{15}$=isooctenyl)

Broadly, the invention is concerned with controlling tobacco suckers with the above compounds which are obtained substantially by the following reaction:

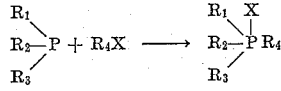

wherein $R_1$, $R_2$, $R_3$ and $R_4$ have the same meaning as above.

Because it is generally easier to prepare phosphines wherein $R_1$, $R_2$ and $R_3$ are the same, the majority (and thus the preferred) of the compounds found to be active fall among the compounds defined by the formula $$(R)_3 \overset{X}{\underset{|}{P}} R_4$$

wherein all three R's are lower alkyl groups, and $R_4$ and X have the same meaning as above.

The above phosphonium halide compounds may be prepared by any of the known methods, such as the method disclosed in U.S. Patent No. 2,703,814. They are prepared from an organic phosphine and the appropriate organic halide according to the equation $$(R)_3 P + R_4 X \longrightarrow (R)_3 \overset{X}{\underset{|}{P}} R_4$$

Generally, the compounds can be prepared by adding a slight excess (ca. 5%) of the appropriate organic halide to a cold solution of the phosphine in an inert solvent, refluxing briefly to complete the reaction and removing the solvent and excess halide under reduced pressure. The product is usually a white solid which requires no further purification for use in controlling tobacco suckers.

To achieve control of tobacco suckers, the compounds may be applied to suckers on the mature tobacco plant in the form of solutions, emulsions, dust formulations, pastes or the like. If the chemical is water soluble, it may simply be dissolved therein in an amount sufficient to give the desired concentration. In the case of water solutions of active ingredients, a small amount of a wetting agent may be added merely to increase the coverage and flow characteristics of the liquid. This wetting agent will be present usually to the extent of about 0.1% or less by weight. The wetting agent may be selected from the useful commercial agents such as Tween-20 (polyoxyethylene sorbitan monolaurate), Atlox G-2081 (a mixture of 30% alkyl aryl sulfonates and 70% polyoxyethylene sorbitan esters of mixed fatty resin acids) or similar agents. Tween-20 and Atlox G-2081 are sold by the Atlas Powder Company. If the compound is water-insoluble, a liquid emulsion may be prepared by dispersing the compound in water containing a small amount of a non-phytotoxic solvent such as acetone and adding thereto an emulsifier. Emulsification can be effected by adding from about 2 to about 10 drops of emulsifier per gram of active ingredient.

Dust formulations of the solid ingredients may be prepared, for example, by dissolving the chemical in a suitable solvent, dispersing the liquid on the solid carrier and allowing the solvent to evaporate. Some solid carriers which are useful are talc, pyrax, attaclay, vermiculite, bentonite and the like. Pastes, such as lanolin paste, will usually contain about 20% of the emulsifier based on the total weight of the formulation. Generally, paste formulations will require about 2 grams of emulsifier per 25 mg. of active ingredient.

Any of the above formulations of my active chemicals may be used which gets the active ingredient to the tobacco sucker. Dusting and spraying, however, are generally objectionable if the whole plant is contacted because high concentration levels of a majority of the disclosed compounds are phytotoxic and can cause damage to the tobacco leaf. Also, I have found that a very small volume of, for example, a liquid formulation is needed when the sucker alone is contacted. Any chemical not coming into contact with the sucker is lost, thus adding to the expense of controlling them.

For the above reasons, I prefer to apply my chemicals in the manner used for the application of oils. In my preferred method, a solution or emulsion of the chemical is poured over the break immediately after a plant has been topped. This may be done by pouring from a measuring device, by applying from a pressure device, by metering from an automatic apparatus which releases a predetermined quantity of solution immediately after a plant is topped, or by any other suitable method. The material travels down the tobacco stalk and contacts each leaf axil, thereby effecting control of the sucker.

The majority of my preferred compounds are water soluble, and 1000 to 10,000 p.p.m. solutions of them were made by dissolving the desired quantity of material in water and adding thereto a small amount of emulsifier. A few ml. of these solutions were poured over the break after topping the tobacco plant, and results were taken about two weeks later. Control of suckers on mature field-grown plants was measured by comparing the length and weight of suckers from the treated plants with the length and weight of those from the untreated plants. Control on greenhouse plants was measured by a visual observation.

The following examples illustrate the effectiveness of my compounds in controlling tobacco suckers. It must be understood that the examples are merely illustrative and are not to be construed as limiting the scope of the invention. The scope will include equivalent compounds and methods for their application which accomplish the results of this disclosure.

EXAMPLE I

Ten thousand p.p.m. solutions of the compounds in the following table were made by dissolving 0.1 gm. of active ingredient in 10 ml. of water containing one drop of Tween-20. One 2½ months-old greenhouse tobacco plant was used for each chemical, and one drop of solution was placed at each leaf axil of the plant after it was topped to 15 leaves. Results were taken after 12 days. The plants had received standard watering and feeding during the 12 days. Following are the results.

| Chemical | Suckers at Treated leaf Axils [1] |
|---|---|
| $(CH_3)_4PI$ | 0 |
| $(C_4H_9)_4PBr$ | 0 |
| $(C_4H_9)_4PCl$ | 0 |
| $(C_4H_9)_3P(Br)C_3H_7$ | 0 |
| $(C_4H_9)_2(CH_3)P(Cl)CH_2\text{-}C_6H_3Cl_2$ | 0 |
| $(C_4H_9)_3P(Cl)CH_2\text{-}C_6H_4\text{-}CH_3$ | 0 |
| $(C_4H_9)_3P(Br)CH_2\text{-}C_6H_4\text{-}CH_3$ | 0 |
| $(C_4H_9)_3P(Br)CH_2\text{-}C_6H_4\text{-}CH_3$ (ortho) | 0 |
| $(C_4H_9)_3P(Cl)CH_2\text{-}C_6H_4\text{-}Br$ | 1 |
| $C_4H_9)_3P(Cl)CH_2\text{-}C_{10}H_7$ | 0 |
| $(C_4H_9)_3P(Cl)C_8H_{15}(\text{isooctenyl})$ | 0 |
| Untreated Control | (2) |

[1] Any growth of less than ¼ inch was considered no growth at all.
[2] 10 suckers (average length—4 inches).

EXAMPLE II

The following chemicals were tested in the same manner as those of Example I at 5000 and 2500 p.p.m. Following are the results.

| Chemical | No. of Suckers per Plant | | Length of Suckers, cm. | |
|---|---|---|---|---|
| | 5,000 p.p.m. | 2,500 p.p.m. | 5,000 p.p.m. | 2,500 p.p.m. |
| $(CH_3)_4PI$ | 0 | 5 | 0 | 1 5 |
| $(C_2H_5)_4PBr$ | 2 | 2 | 3 | 2 |
| $(C_4H_9)_4PBr$ | 0 | 1 | 0 | 3 |
| $(C_4H_9)_4PCl$ | 0 | 1 | 0 | 3 |
| $(C_4H_9)_4PI$ | 6 | 0 | 3 | 0 |
| $(C_4H_9)_3P(Br)C_3H_7$ | 0 | 1 | 0 | 7 |
| $(C_4H_9)_2(CH_3)P(Cl)CH_2\text{-}(2,4\text{-}Cl_2C_6H_3)$ | 0 | 1 | 0 | 9 |
| $(C_4H_9)_3P(Cl)CH_2\text{-}C_6H_4\text{-}CH_3$ | 0 | ---- | 0 | ---- |
| $(C_4H_9)_3P(Br)CH_2\text{-}C_6H_4\text{-}CH_3$ | 6 | 4 | 4 | 6 |
| $(C_4H_9)_3P(Cl)CH_2\text{-}C_6H_4\text{-}Br$ | 5 | ---- | 4 | ---- |
| $(C_4H_9)_3P(Cl)CH_2\text{-}C_{10}H_7$ | 0 | 0 | 0 | 0 |
| $(C_4H_9)_3P(Cl)C_8H_{15}$ | 0 | 0 | 0 | 0 |
| $(C_4H_9)_3P(Cl)CH_2\text{-}C_6H_5$ | 0 | ---- | 0 | ---- |
| $(C_4H_9)_3P(Cl)CH_2\text{-}(Cl_2C_6H_3)$ | ---- | 3 | ---- | 5 |
| $(C_4H_9)_3P(I)C_2H_5$ | 2 | 3 | 5 | 5 |
| Untreated Control | 6 | | 10 | |

[1] Run at 1,500 p.p.m.

EXAMPLE III

These tests were conducted on field-grown, mature tobacco plants.

(A) *Control of Tobacco Suckers With*

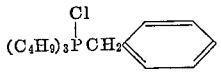

Approximately 1,000, 5,000 and 10,000 p.p.m. solutions of benzyltributylphosphonium chloride were prepared by dissolving 1, 5, and 10 grams, respectively, of the chemical in 1000 ml. of water. About ¾ ml. of Tween-20 was added to each solution and the resulting solutions were stirred thoroughly. Three plants were used for each concentration of the chemical. Fifteen ml. of the respective concentrations was applied to the top of each of the three plants immediately after topping to remove the terminal growth. The formulation was allowed to run down the plant, thereby contacting each of the axillary bud initials. Results were taken 14 days later by removing the axillary shoots from the three plants and weighing them. The weight of the treated shoots was compared to the weight of untreated ones. Following are the results.

Concentration, p.p.m.:     Weight of suckers from 3 plants, gms.

1,000 ---------------------------------- 122.1
5,000 ---------------------------------- 77.4
10,000 --------------------------------- 34.0
Untreated control---------------------- 140.3

(B) *Control of Tobacco Suckers With*

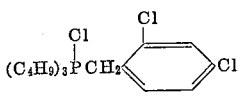

The solutions were prepared and the tests were conducted exactly as described in Example I. The following results were obtained.

Concentration, p.p.m.:     Weight of suckers from 3 plants, gms.

1,000 ---------------------------------- 94.5
5,000 ---------------------------------- 53.2
10,000 --------------------------------- 26.6
UNTC ---------------------------------- 140.3

(C) *Control of Tobacco Suckers With* $(C_4H_9)_4PBR$

The solutions were prepared and the tests were conducted exactly as described in Examples I and II. Following are the results.

Concentration, p.p.m.:     Weight of suckers from 3 plants, gms.

1,000 ---------------------------------- ——
5,000 ---------------------------------- 99.5
10,000 --------------------------------- 15.7
UNTC ---------------------------------- 140.3

As can be seen from these results, the weight, and consequently, the size of the sucker was drastically reduced. At the higher concentrations, weights of the treated suckers were as little as ⅒ of the weight of the untreated ones. There was a corresponding reduction in overall length (not apparent from the tables) of the treated suckers.

In one case (10,000 p.p.m. of $(C_4H_9)_4PBr$), the length of the treated member was about 1/5 that of the untreated one.

Even though there were heavy rains after the chemicals were applied to the mature tobacco plant, no further application was needed to control the suckers. Neither was it necessary, either before or after application, to remove any suckers by hand.

Whereas I have disclosed sucker control with 1000 to 10,000 p.p.m. solutions of my active ingredients, it is to be understood that time of application, weather conditions, age of the plants, etc. will govern to a large extent the rate to be applied. It is therefore contemplated that, depending on conditions, more or less of the active compound may be used to effect control.

Having described the invention, what is claimed is:

1. A method of controlling the growth of the axillary shoots of a mature tobacco plant which comprises contacting said shoots with a growth controlling amount of a chemical defined by the formula

wherein $R_1$, $R_2$, and $R_3$ are lower alkyl groups and $R_4$ is a member of the group consisting of lower alkyl, alkenyl, benzyl, alkyl-substituted benzyl, halo-substituted benzyl, and naphthylmethyl, and X is a member of the group consisting of Br, Cl and I.

2. A method according to claim 1 in which the chemical is tetramethylphosphonium iodide.

3. A method according to claim 1 in which the chemical is tetrabutylphosphonium bromide.

4. A method according to claim 1 in which the chemical is tetrabutylphosphonium chloride.

5. A method according to claim 1 in which the chemical is tetraethylphosphonium bromide.

6. A method according to claim 1 in which the chemical is benzyltributylphosphonium chloride.

7. A method according to claim 1 in which the chemical is tetrabutylphosphonium iodide.

8. A method according to claim 1 in which the chemical is tributylmethylphosphonium bromide.

9. A method according to claim 1 in which the chemical is dibutyl-2,4-dichlorobenzylmethylphosphonium chloride.

10. A method according to claim 1 in which the chemical is tributyl-p-methylbenzylphosphonium chloride.

11. A method according to claim 1 in which the chemical is tributyl-o-methylbenzylphosphonium bromide.

12. A method according to claim 1 in which the chemical is p-bromobenyltributylphosphonium chloride.

13. A method according to claim 1 in which the chemical is tributyl-1-naphthylmethylphosphonium chloride.

14. A method according to claim 1 in which the chemical is tributylisooctenylphosphonium chloride.

15. A method according to claim 1 in which the chemical is tributyl-2,4-dichlorobenzylphosphonium chloride.

16. A method according to claim 1 in which the chemical is tributylethylphosphonium iodide.

17. A method according to claim 1 in which the chemical is tributyl-p-methylbenzylphosphonium bromide.

18. A method according to claim 1 in which the chemical is tributylpropylphosphonium bromide.

References Cited in the file of this patent
UNITED STATES PATENTS 2,855,285     Antognini _____ Oct. 7, 1958
2,946,824     Chiddix _____ July 26, 1960

OTHER REFERENCES

"Plant Regulators," CBCC Positive Data Series, No. 2, June 1955, pages *a, b, c*, 1 and 38, published by National Research Council.